(12) United States Patent
Ladra et al.

(10) Patent No.: US 8,763,771 B2
(45) Date of Patent: Jul. 1, 2014

(54) ACTIVE OSCILLATION DAMPER WITHOUT DIRECT ACCELERATION DETECTION

(71) Applicant: Siemens Aktiengesellschaft, München (DE)

(72) Inventors: Uwe Ladra, Erlangen (DE); Elmar Schäfers, Fürth (DE); Torsten Schür, Erlangen (DE); Dietmar Stoiber, Fürth (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/630,606

(22) Filed: Sep. 28, 2012

(65) Prior Publication Data

US 2013/0081914 A1    Apr. 4, 2013

(30) Foreign Application Priority Data

Sep. 30, 2011    (EP) .................................... 11183453

(51) Int. Cl.
*F16F 13/00*    (2006.01)
*G05B 13/02*    (2006.01)

(52) U.S. Cl.
USPC .......................................... 188/378; 700/275

(58) Field of Classification Search
USPC ............... 188/378–380; 248/550; 701/29, 37; 700/275
See application file for complete search history.

(56) References Cited

U.S. PATENT DOCUMENTS

| | | | |
|---|---|---|---|
| 4,083,433 A | 4/1978 | Bawroski | |
| 4,969,662 A * | 11/1990 | Stuart | 280/5.515 |
| 5,744,879 A | 4/1998 | Stoiber | |
| 5,850,112 A | 12/1998 | Sienz et al. | |
| 5,952,742 A | 9/1999 | Stoiber et al. | |
| 6,118,245 A | 9/2000 | Sienz et al. | |
| 6,566,771 B1 | 5/2003 | Stoiber | |
| 6,690,133 B2 | 2/2004 | Knorr et al. | |
| 6,744,155 B1 | 6/2004 | Stoiber | |
| 6,825,633 B2 | 11/2004 | Hamann et al. | |
| 6,886,436 B2 | 5/2005 | Forster et al. | |
| 6,903,529 B2 | 6/2005 | Künzel et al. | |
| 6,979,932 B2 | 12/2005 | Hamann et al. | |
| 7,078,842 B2 | 7/2006 | Hoppe et al. | |
| 7,152,503 B2 | 12/2006 | Forster et al. | |
| 7,156,224 B2 | 1/2007 | Forster et al. | |

(Continued)

FOREIGN PATENT DOCUMENTS

WO   WO 2007129627 A1   11/2007
WO   WO 2008107668 A2   9/2008

*Primary Examiner* — Christopher Schwartz
(74) *Attorney, Agent, or Firm* — Feiereisen LLC

(57) ABSTRACT

An active oscillation damper has a balancing mass which is movable relative to an oscillating mechanical structure. The control device then determines a compensation movement for the balancing mass based on a determined three-dimensional absolute motion of the mechanical structure. A balancing drive, arranged on the mechanical structure and acting on the balancing mass, is activated by the control device. The balancing mass is displaced by the balancing drive relative to the mechanical structure commensurate with the determined compensation movement. The measured values supplied to the control device include actual values of the balancing drive and/or a position of the balancing mass relative to the mechanical structure and/or at least one derivative with respect to time of the position of the balancing mass relative to the mechanical structure. The three-dimensional absolute motion of the mechanical structure is determined by the control device from the aforementioned values.

9 Claims, 2 Drawing Sheets

(56) References Cited

U.S. PATENT DOCUMENTS

| | | |
|---|---|---|
| 7,208,901 B2 | 4/2007 | Ladra et al. |
| 7,421,922 B2 | 9/2008 | Hamann et al. |
| 7,424,337 B2 | 9/2008 | Schäfers et al. |
| 7,566,193 B2 | 7/2009 | Haj-Fraj et al. |
| 7,654,746 B2 | 2/2010 | Ladra et al. |
| 7,800,334 B2 | 9/2010 | Hamann et al. |
| 7,818,087 B2 | 10/2010 | Birzer et al. |
| 7,891,112 B2 | 2/2011 | Forster et al. |
| 7,902,785 B2 | 3/2011 | Denk et al. |
| 7,928,620 B2 | 4/2011 | Denk et al. |
| 7,949,445 B2 * | 5/2011 | Poilbout ......................... 701/37 |
| 7,950,639 B2 | 5/2011 | Ladra et al. |
| 7,997,431 B2 | 8/2011 | Ladra et al. |
| 8,040,017 B2 | 10/2011 | Ladra et al. |
| 8,063,598 B2 | 11/2011 | Stoiber et al. |
| 8,157,252 B2 | 4/2012 | Ladra et al. |
| 8,294,314 B2 | 10/2012 | Denk et al. |
| 2003/0090645 A1 | 5/2003 | Kato |
| 2006/0238061 A1 | 10/2006 | Hoppe et al. |
| 2008/0105071 A1 | 5/2008 | Hamann et al. |
| 2008/0215164 A1 | 9/2008 | Denk et al. |
| 2008/0257667 A1 | 10/2008 | Hamann et al. |
| 2009/0278019 A1 | 11/2009 | Hamann et al. |
| 2009/0302699 A1 | 12/2009 | Denk et al. |
| 2009/0315505 A1 | 12/2009 | Denk et al. |
| 2010/0049394 A1 * | 2/2010 | Ammon et al. .................. 701/29 |
| 2010/0092262 A1 | 4/2010 | Hamann et al. |
| 2010/0178123 A1 | 7/2010 | Ladra et al. |
| 2010/0247261 A1 | 9/2010 | Hamann et al. |
| 2011/0006559 A1 | 1/2011 | Schäfers et al. |
| 2011/0234125 A1 | 9/2011 | Krejtschi et al. |
| 2012/0217108 A1 | 8/2012 | Muragishi et al. |
| 2013/0085607 A1 * | 4/2013 | Ladra et al. .................. 700/275 |

\* cited by examiner

ACTIVE OSCILLATION DAMPER WITHOUT DIRECT ACCELERATION DETECTION

CROSS-REFERENCES TO RELATED APPLICATIONS

This application claims the priority of European Patent Application, Serial No. 11183453.7, filed Sep. 30, 2011, pursuant to 35 U.S.C. 119(a)-(d), the content of which is incorporated herein by reference in its entirety as if fully set forth herein.

BACKGROUND OF THE INVENTION

The present invention relates to an active oscillation damper, a method for operating an active oscillation damper, a control device for an active oscillation damper, and a control program executed on the control device for operating the active oscillation damper.

The following discussion of related art is provided to assist the reader in understanding the advantages of the invention, and is not to be construed as an admission that this related art is prior art to this invention.

In order to be able to detect and compensate for undesired oscillations of an oscillating mechanical structure, it is necessary to detect the exact deviation of the oscillating mechanical structure. In the prior art this is generally implemented by an acceleration sensor being arranged on the oscillating mechanical structure, which detects the (absolute) acceleration of the oscillating mechanical structure. As a result of the acceleration, therefore, the deviation caused by the oscillation of the oscillating mechanical structure is determined—generally by two-fold integration—so that the oscillation may be subsequently damped.

An acceleration sensor is not always available and suitable in all situations.

It would therefore be desirable and advantageous to address this problem and to obviate other prior art shortcomings by enabling the absolute motion of the oscillating mechanical structure to be determined in absence of an acceleration sensor.

SUMMARY OF THE INVENTION

According to one aspect of the present invention, a method for operating an active oscillation damper which has a balancing mass capable of moving relative to an oscillating mechanical structure includes the steps of determining an absolute motion of the mechanical structure in three-dimensional space from measured values supplied to a control device of the active oscillation damper, determining with the control device, based on the determined absolute motion, a compensation movement for the balancing mass which dampens an oscillation of the mechanical structure, controlling with the control device, based on the determined compensation movement, a balancing drive arranged on the mechanical structure and operating on the balancing mass, so as to displace the balancing mass with the balancing drive relative to the mechanical structure commensurate with the compensation movement, and determining the absolute motion of the mechanical structure in three-dimensional space with the control device based on the measured values supplied to the control device. The measured values supplied to the control device include at least one value selected from actual values of the balancing drive, a position of the balancing mass relative to the mechanical structure, and at least one derivative with respect to time of the position of the balancing mass relative to the mechanical structure.

According to another aspect of the present invention, an active oscillation damper includes a balancing mass movable relative to an oscillating mechanical structure, a balancing drive arranged on the mechanical structure and operating on the balancing mass so as to displace the balancing mass relative to the mechanical structure, a sensor constructed to measure at least one value selected from actual values of the balancing drive, a position of the balancing mass relative to the mechanical structure, and at least one derivative with respect to time of the position of the balancing mass relative to the mechanical structure, and a control device connected for data transmission to the sensor for receiving the at least one value measured by the sensor. The control device is configured to operate the active oscillation damper with the aforedescribed method steps.

According to another aspect of the present invention, a control device for an active oscillation damper is configured to operate the active oscillation damper with the aforedescribed method steps.

The present invention also relates to a control program embodied on a computer-readable non-transitory medium and having machine code, wherein the machine code when loaded into memory of a control device for an active oscillation damper and directly executed on the control device causes the control device to operate the active oscillation damper by executing the aforedescribed method steps.

According to an advantageous feature of the present invention, the measured values supplied to the control device may include actual values of the balancing drive and/or a position of the balancing mass relative to the mechanical structure and/or at least one derivative with respect to time of the position of the balancing mass relative to the mechanical structure and the absolute motion of the mechanical structure in three-dimensional space is determined by the control device using the aforementioned values.

According to another advantageous feature of the present invention, the measured values may include the actual current or the actual moment of the balancing drive as well as the first derivative with respect to time of the position of the balancing mass relative to the mechanical structure. The absolute motion can be particularly easily determined with this method.

According to another advantageous feature of the present invention, the absolute motion may be determined from additional measured values. Advantageously, however, the measured values include solely the aforementioned values.

According to another advantageous feature of the present invention, the balancing mass may be displaced with the control device by superimposing a movement relative to the mechanical structure through corresponding activation of the balancing drive in addition to the compensation movement. This allows non-linear frictional effects which may have a disruptive effect on the detection of the measured values to be minimized. Advantageously, the superimposed movement may be determined such that at any time the first, the second and/or the third derivative with respect to time of the superimposed movement are different from zero.

The superimposed movement is generally an oscillating movement. The excursion thereof may be determined as required. The frequency thereof is generally relatively low.

The aforementioned measures are entirely sufficient if the oscillating mechanical structure is not moved during operation. In this case, the compensation movement may advantageously be determined directly using the absolute motion of the oscillating mechanical structure, i.e. without having to take into account further variable values. Alternatively, however, the mechanical structure may be displaced with a structural drive based on a reference displacement movement. The reference displacement movement is here advantageously taken into account by the control device when determining the compensation movement.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
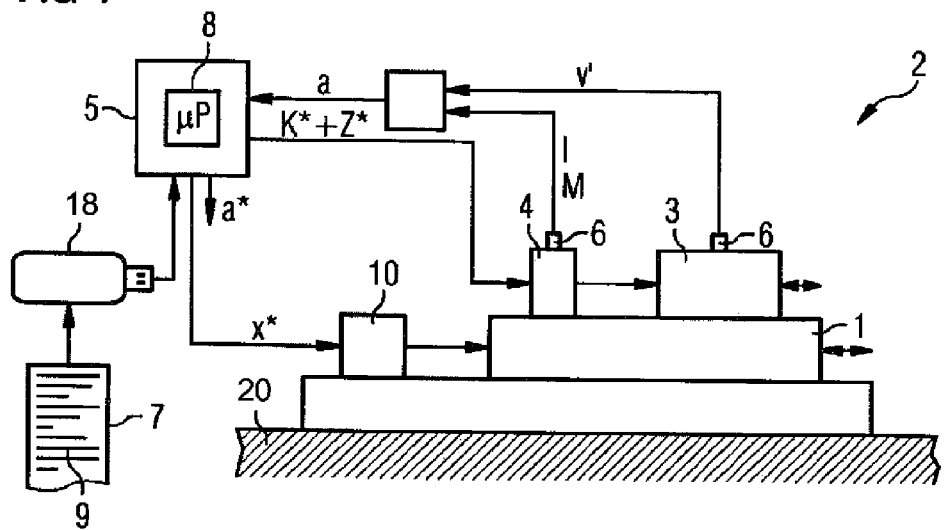
FIG. 1 shows schematically an oscillating mechanical structure and an active oscillation damper.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there are shown an oscillating mechanical structure and an active oscillation damper 2 with a balancing mass 3, a balancing drive 4, a control device 5 and sensors 6.

The balancing mass 3 is mobile relative to the oscillating mechanical structure 1. The balancing drive 4 is arranged on the oscillating mechanical structure 1. The balancing drive operates on the balancing mass 3. The balancing mass 3 may be displaced with the balancing drive 4 relative to the oscillating mechanical structure 1.

Actual values I, M of the balancing drive 4, a position x' of the balancing mass 3 relative to the oscillating mechanical structure 1 and/or at least a derivative with respect to time v' of the position x' of the balancing mass 3 relative to the oscillating mechanical structure 1 may be detected with the sensors 6. In particular, on the one hand, the actual current I or alternatively the actual moment M of the balancing drive 4 and, on the other hand, the velocity v' of the balancing mass 3 relative to the oscillating mechanical structure 1 may be determined by means of the sensors 6.

The control device 5 is connected for communication to the sensors 6 for receiving values I, M, v' detected by the sensors 6. The control device is configured so as to operate the active oscillation damper 2 according to an operating method which is described hereinafter in more detail.

According to the view of FIG. 1, the control device 5 generally has an internal microprocessor 8. The control device 5 is, therefore, generally configured as a control device which may be programmed by software and which executes a computer program 7. The computer program 7 has the machine code 9 which can be processed directly by the control device 5 (more specifically: the microprocessor 8 of the control device 5). Execution of the machine code 9 causes the control device 5 to operate the active oscillation damper 2 according to the operating method according to the invention. The computer program 7 thus affects the corresponding configuration of the control device 5.

The computer program 7 may be supplied to the control device 5 in any manner. For example, the computer program 7 may be stored in machine-readable form—in particular in electronic form—on a data carrier 18 and supplied to the control device 5 via the data carrier 18. Purely by way of example, the data carrier 18 according to FIG. 1 is configured as a USB memory stick. This embodiment, however, may be readily varied.

The operating method according to the invention is described in more detail hereinafter in conjunction with FIG. 2.

Figure 2:
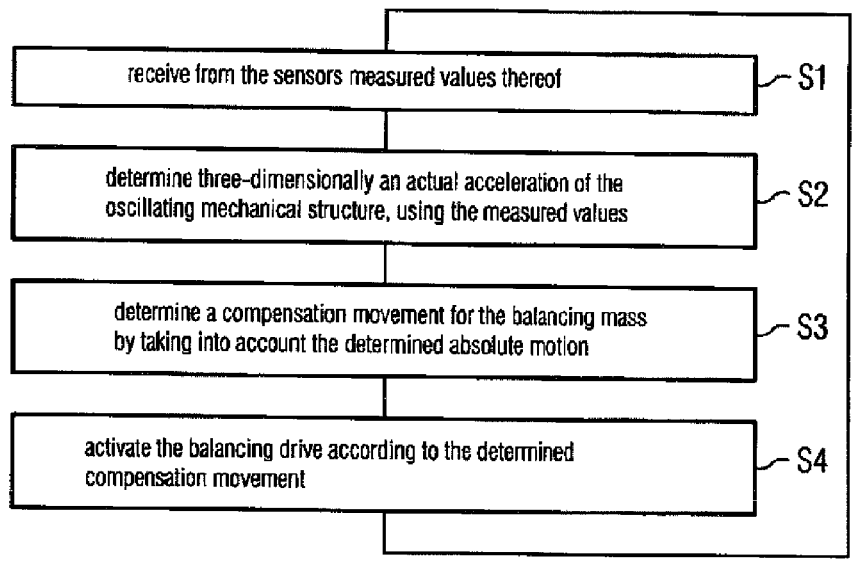
FIG. 2 shows a sequence diagram according to the present invention.

According to FIG. 2, the control device 1 receives from the sensors 6 measured values M, I v' thereof in a step S1, in particular the actual moment M or the actual current I of the balancing drive 4 and the actual velocity v' of the balancing mass 3 relative to the oscillating mechanical structure 1. If required, further values may be received.

In a step S2, using the received measured values I, M, v', the control device 5 determines three-dimensionally an actual acceleration a of the oscillating mechanical structure 1. The actual acceleration a is characteristic of the absolute motion of the oscillating mechanical structure 1. The step S2 corresponds to the three-dimensional determination of the absolute motion of the mechanical structure 1.

Figure 3:
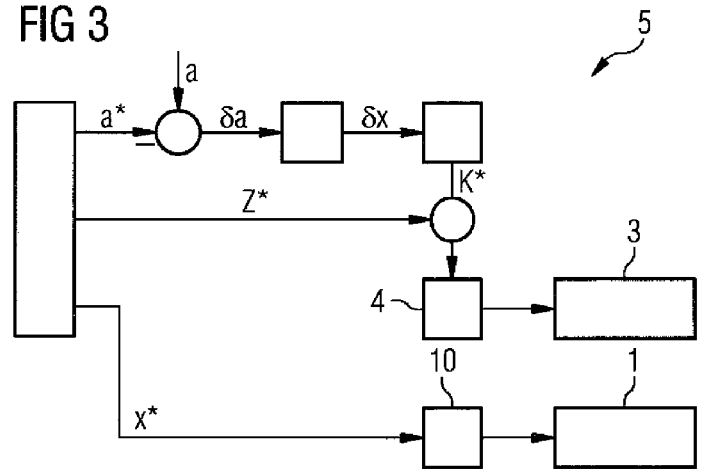
FIG. 3 shows a control diagram according to the present invention.

It is possible—see FIG. 3—for the oscillating mechanical structure 1 to be displaced by means of a structural drive 10 in relation to a support 20 according to a reference displacement movement. In this case, the reference displacement movement is taken into account by the control device 5 when a compensation movement K* is determined. In the simplest case, this takes place according to FIG. 3 by a reference acceleration a* of the oscillating mechanical structure 1 corresponding to the reference displacement movement being subtracted from the determined actual acceleration a of the oscillating mechanical structure 1 and the compensation movement K* being determined using a resulting acceleration $\delta a$ determined in this manner.

Subsequently, the case is exclusively described in which the oscillating mechanical structure 1 is displaced according to a reference displacement movement, i.e. using the difference between the actual acceleration a and the reference acceleration a* of the oscillating mechanical structure 1, the resulting acceleration $\delta a$ is used for determining the compensation movement K*. If the oscillating mechanical structure 1 is not displaced, this merely represents the case where the reference acceleration a* is identical to 0, the resulting acceleration $\delta a$ thus being identical to the actual acceleration a.

According to FIG. 2 in a step S3, by taking into account the determined absolute motion—i.e. using the resulting acceleration $\delta a$—the control device determines the compensation movement K* for the balancing mass 3. The determination is undertaken by the control device 5 such that the compensation movement K* damps the oscillation of the mechanical structure 1. The corresponding determination methods are known and familiar to persons skilled in the art. In particular, the determination may take place in a manner as is explained hereinafter in conjunction with FIG. 4.

Figure 4:
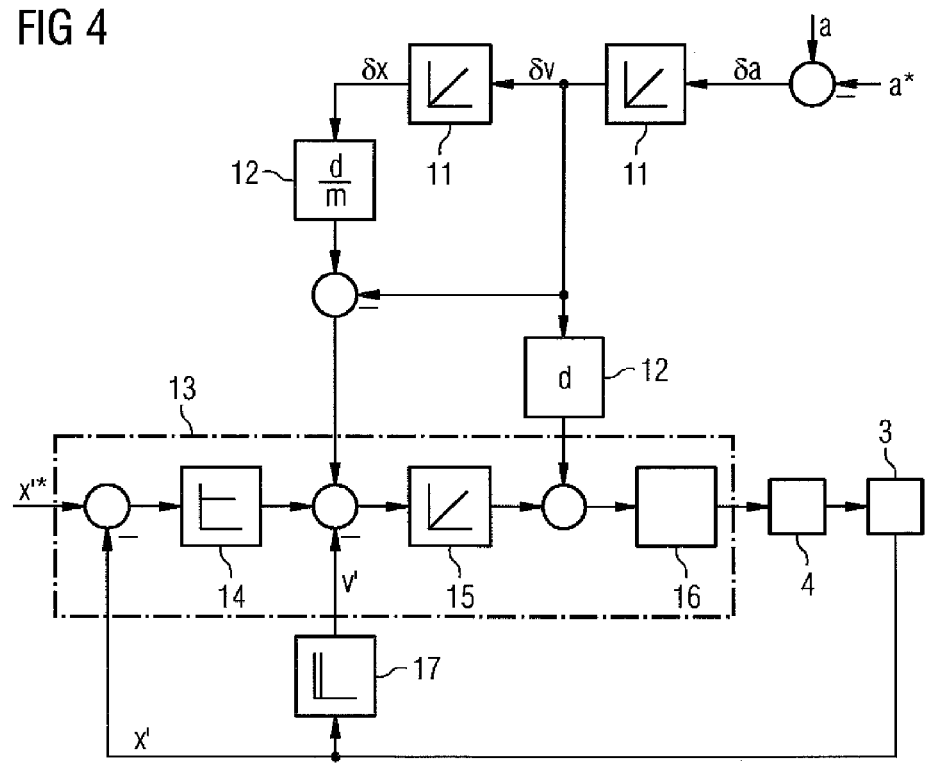
FIG. 4 shows a more detailed embodiment of FIG. 3.

According to the example of FIG. 4, by two-fold integration in integrators 11 initially a resulting velocity $\delta v$ and then a resulting actual position $\delta x$ of the mechanical structure 1 is determined using the resulting acceleration $\delta a$.

The resulting velocity δv and the resulting position δx may be scaled in scaling members 12 using appropriate scaling factors. In the scaling members 12, d stands for desired damping and m for the mass (in kg) of the balancing mass 3.

The corresponding scaled values may be fed according to FIG. 4 to a controller structure 13 which controls the position x' and the velocity v' of the balancing mass 3 relative to the mechanical structure 1. The controller structure 13 internally has a position controller 14, a velocity controller 15 and optionally a current controller 16. The controller structure 13 acts on the balancing drive 4. The position x' of the balancing mass 3 relative to the mechanical structure 1 and the corresponding velocity v' are supplied as actual values x', v' to the controller structure 13. The velocity v' may, for example, be determined in a differentiating member 17 by differentiating the position x'. A reference position x'* is supplied the adjusting structure 13 as a reference value x'*. The reference position x'* may be constant or chronologically variable.

It is possible to subject the resulting acceleration δa or values derived from the resulting acceleration δa to frequency filtering. Such frequency filtering is generally known to the person skilled in the art. It is not shown in FIG. 4.

According to FIG. 2, in a step S4 the control device 5 activates the balancing drive 4 according to the determined compensation movement K*. As a result, the balancing mass 3 is displaced by means of the balancing drive 4 relative to the mechanical structure 1 according to the compensation movement K*. The balancing mass 3, however, is not supported on the mechanical structure 1, insofar as it relates to the direction of displacement defined by the compensation movement K*. This may be implemented by the balancing mass 3 being driven with the balancing drive 4 in piggyback fashion, as it were. Alternatively, the balancing mass 3 may be guided relative to the mechanical structure 1, namely at right angles to the direction of displacement, for example via guide rails. Also in this case, however, force is not directly transmitted from the balancing mass 3 to the mechanical structure 1, i.e. bypassing the balancing drive 4.

It is possible that the control device 5 activates the balancing drive 4 exclusively according to the compensation movement K*. Alternatively—see FIG. 1—it is possible for the balancing mass 3 to be additionally displaced by the control device 5 by corresponding activation of the balancing drive 4 by a superimposed movement Z* relative to the mechanical structure 1. To this end, the reference position value x'*—see FIG. 4—may be accordingly modulated, for example. The superimposed movement Z* is preferably determined such that—relative to the superimposed movement Z*—at any time at least one of the following values is different from zero:

the first derivative with respect to time i.e. the velocity component of the movement of the balancing mass 3 relative to the mechanical structure 1 effected by the superimposed movement Z*, the second derivative with respect to time i.e. the acceleration component of the movement of the balancing mass 3 relative to the mechanical structure 1 effected by the superimposed movement Z*, and the third derivative with respect to time, i.e. the displacement component of the movement of the balancing mass 3 relative to the mechanical structure 1 effected by the superimposed movement Z.

Generally, the superimposed movement Z* is an oscillating movement. Its frequency has to be outside the resonance spectrum of the mechanical structure 1, for example of sufficiently low-frequency, By means of the present invention it is, therefore, possible to damp an oscillation of the oscillating mechanical structure 1 in an effective manner, even when an acceleration signal is not able to be made directly available to the control device 5.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating an active oscillation damper which comprises a balancing mass capable of moving relative to an oscillating mechanical structure, comprising the steps of:

determining an absolute motion of the mechanical structure in three-dimensional space from measured values supplied to a control device of the active oscillation damper, determining with the control device, based on the determined absolute motion, a compensation movement for the balancing mass which dampens an oscillation of the mechanical structure, and controlling with the control device, based on the determined compensation movement, a balancing drive arranged on the mechanical structure and operating on the balancing mass, so as to displace the balancing mass with the balancing drive relative to the mechanical structure commensurate with the compensation movement, wherein the measured values supplied to the control device comprise at least one value selected from actual values of the balancing drive, a position of the balancing mass relative to the mechanical structure, and at least one derivative with respect to time of the position of the balancing mass relative to the mechanical structure.

2. The method of claim 1, wherein the measured values comprise an actual current or the actual moment of the balancing drive and the a derivative with respect to time of the position of the balancing mass relative to the mechanical structure.

3. The method of claim 1, wherein the measured values consist of at least one value selected from an actual current or the actual moment of the balancing drive, and a first derivative with respect to time of the position of the balancing mass relative to the mechanical structure.

4. The method of claim 1, wherein the measured values consist of an actual current or the actual moment of the balancing drive and a first derivative with respect to time of the position of the balancing mass relative to the mechanical structure.

5. The method of claim 1, further comprising the step of controlling the balancing drive so as to displace the balancing mass with the control device relative to the mechanical structure by a superimposed movement in addition to the compensation movement, wherein at any time at least one of a first, a second and a third derivative with respect to time of the superimposed movement is different from zero.

6. The method of claim 1, further comprising the step of displacing the mechanical structure with a structural drive in accordance with a reference displacement movement, and taking the reference displacement movement into account with the control device when determining the compensation movement.

7. A control program embodied on a computer-readable non-transitory medium and comprising machine code, wherein the machine code when loaded into memory of a control device for an active oscillation damper and directly executed on the control device causes the control device to operate the active oscillation damper by:

determining an absolute motion of the mechanical structure in three-dimensional space from measured values supplied to a control device of the active oscillation damper, determining, based on the determined absolute motion, a compensation movement for the balancing mass which dampens an oscillation of the mechanical structure, and controlling, based on the determined compensation movement, a balancing drive arranged on the mechanical structure and operating on the balancing mass, so as to displace the balancing mass with the balancing drive relative to the mechanical structure commensurate with the compensation movement, wherein the measured values supplied to the control device include at least one value selected from actual values of the balancing drive, a position of the balancing mass relative to the mechanical structure, and at least one derivative with respect to time of the position of the balancing mass relative to the mechanical structure.

8. A control device for an active oscillation damper, wherein the control device is configured to operate the active oscillation damper by determining an absolute motion of the mechanical structure in three-dimensional space from measured values supplied to a control device of the active oscillation damper, determining, based on the determined absolute motion, a compensation movement for the balancing mass which dampens an oscillation of the mechanical structure, and controlling, based on the determined compensation movement, a balancing drive arranged on the mechanical structure and operating on the balancing mass, so as to displace the balancing mass with the balancing drive relative to the mechanical structure commensurate with the compensation movement, wherein the measured values supplied to the control device include at least one value selected from actual values of the balancing drive, a position of the balancing mass relative to the mechanical structure, and at least one derivative with respect to time of the position of the balancing mass relative to the mechanical structure.

9. An active oscillation damper, comprising:

a balancing mass movable relative to an oscillating mechanical structure, a balancing drive arranged on the mechanical structure and operating on the balancing mass so as to displace the balancing mass relative to the mechanical structure, a sensor constructed to measure at least one value selected from actual values of the balancing drive, a position of the balancing mass relative to the mechanical structure, and at least one derivative with respect to time of the position of the balancing mass relative to the mechanical structure, and a control device connected for data transmission to the sensor for receiving the at least one value measured by the sensor, wherein the control device is configured to operate the active oscillation damper by determining an absolute motion of the mechanical structure in three-dimensional space from the at least one value measured by the sensor, determining, based on the determined absolute motion, a compensation movement for the balancing mass which dampens an oscillation of the mechanical structure, and controlling the balancing drive based on the determined compensation movement.

\* \* \* \* \*